(12) United States Patent
Jerg et al.

(10) Patent No.: US 8,398,784 B2
(45) Date of Patent: Mar. 19, 2013

(54) DISHWASHER

(75) Inventors: Helmut Jerg, Giengen (DE); Kai Paintner, Welden (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 13/543,906

(22) Filed: Jul. 9, 2012

(65) Prior Publication Data

US 2012/0273015 A1 Nov. 1, 2012

Related U.S. Application Data

(63) Continuation of application No. 11/791,380, filed as application No. PCT/EP2005/056514 on Dec. 6, 2005, now abandoned.

(30) Foreign Application Priority Data

Dec. 9, 2004 (DE) .......................... 10 2004 059 425
Jan. 28, 2005 (DE) .......................... 10 2005 004 093

(51) Int. Cl.
*B08B 3/00* (2006.01)
(52) U.S. Cl. ..................... 134/56 D; 134/57 D
(58) Field of Classification Search ............. 134/56 D
See application file for complete search history.

(56) References Cited

U.S. PATENT DOCUMENTS

| 6,009,669 A | 1/2000 | Jardine et al. |
| 6,679,222 B1 | 1/2004 | Reischl et al. |
| 2006/0278257 A1 | 12/2006 | Jerg et al. |

FOREIGN PATENT DOCUMENTS

| DE | 7110279 U | 3/1971 |
| DE | 2016831 A1 | 10/1971 |
| DE | 3626887 A1 | 2/1988 |
| DE | 10353775 A1 | 2/2005 |
| DE | 10024892 A1 | 11/2011 |
| EP | 0358279 A1 | 3/1990 |
| EP | 0777998 A1 | 6/1997 |
| FR | 2491322 A1 | 4/1982 |
| JP | 57-145699 A | 9/1982 |
| JP | 8224201 A | 9/1996 |
| JP | 2002130944 A | 5/2002 |

OTHER PUBLICATIONS

International Search Report PCT/EP2005/056514.
National Search Report DE 10 2005 004 093.4.

*Primary Examiner* — Michael Barr
*Assistant Examiner* — Jason Ko
(74) *Attorney, Agent, or Firm* — James E. Howard; Andre Pallapies

(57) ABSTRACT

A dishwasher includes a washing container, devices for washing dishes by means of rinsing liquor, and a sorption drying device which is connected in an air-conducting manner to the washing container via an outlet of the washing container and an inlet of the washing container. The sorption drying device is provided with a sorption column encompassing reversibly dehydratable material and is disposed between a wall of the washing container and an exterior housing wall of the dishwasher.

12 Claims, 1 Drawing Sheet

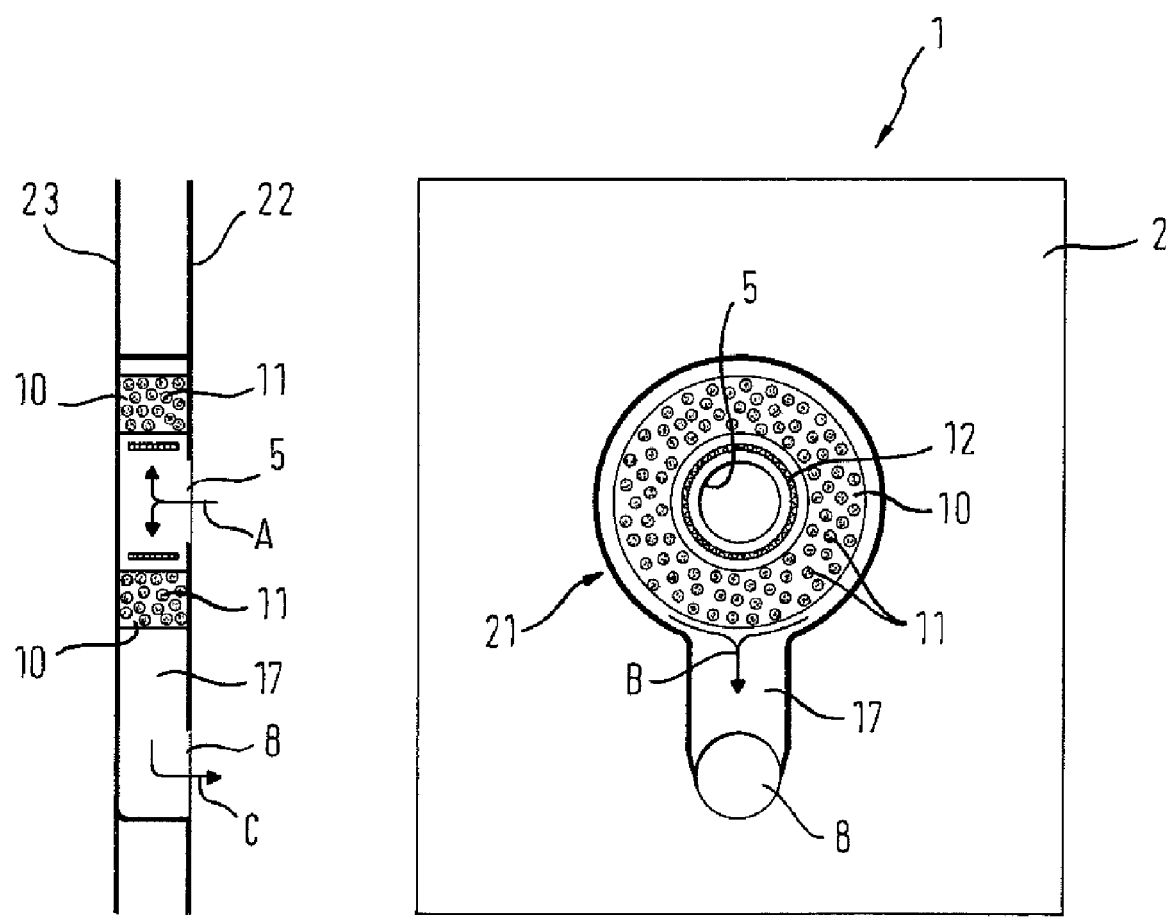

DISHWASHER

CROSS-REFERENCE TO RELATED APPLICATIONS

This application is a continuation, under 35 U.S.C. §120, of U.S. application Ser. No. 11/791,380, filed May 23, 2007, which is a U.S. national stage application under 35 U.S.C. §371 of PCT/EP2005/056514, filed Dec. 6, 2005, which designated the United States; this application also claims the priority, under 35 U.S.C. §119, to German Application No. 10 2004 059 425.2, filed Dec. 9, 2004, and to German Application No. 10 2005 004 093.4, filed Jan. 28, 2005.

BACKGROUND OF THE INVENTION

The invention relates to a dishwasher with a washing container and devices for washing dishes by means of rinsing liquor and with a sorption drying device which is connected in an air-conducting manner to the washing container via an outlet of the washing container and an inlet of the washing container, and is provided with a sorption column encompassing reversible dehydratable material.

As is known, conventional dishwashers perform a washing process whose programme sequence generally consists of at least one "Pre-wash" partial programme step, a "Clean" partial programme step, at least one "Intermediate wash" partial programme step, a "Clear wash" partial programme step and a "Dry" partial programme step. To increase the cleaning effect the rinsing fluid or rinsing liquor is heated before or during a partial programme step. The rinsing fluid is normally heated by means of electrical heating elements. Different drying systems are known for drying the items to be washed in a dishwasher.

DE 20 16 831 discloses, for example, a dishwasher of the type already mentioned in which the air is conducted from the washing container through a sealable opening in the wall of the washing container on reversibly dehydratable material, and from there to the outside through an opening. Desorption of the reversibly dehydratable material takes place during the non-operating phase of the device, the water vapour formed thereby being conducted to the outside through the opening. The dishwasher described is disadvantageous from the energy viewpoint because the regeneration of the reversibly dehydratable material takes place during a non-operating phase of the appliance, i.e. at a time when none of the partial programme steps already described is being carried out. A further disadvantage consists in the fact that the possibility of damage to the surrounding kitchen furniture cannot be ruled out as a result of the discharge of the water vapour formed during regeneration of the reversibly dehydratable material to the outside. In this case the regeneration is associated with an additional energy requirement which is additional to the energy required during the partial programme steps.

In order to minimise the energy expended during operation of a dishwasher, DE 103 53 774.0 of the applicant discloses a dishwasher with a washing container and devices for washing dishes by means of rinsing liquor which is provided with a sorption column which is connected in an air-conducting manner to the washing container and encompasses reversibly dehydratable material, where on the one hand the sorption column is used for drying the dishes and on the other hand the thermal energy utilised for desorption of the sorption column is used to heat the rinsing liquor and/or the dishes in the washing container, at least in part.

To solve the same problem DE 103 53 775.9 of the applicant proposes conducting air from a processing space and/or from ambient air through a sorption column and into the processing space for operating an appliance in the at least one "Dry" partial programme step, where the sorption column encompasses reversibly dehydratable material and moisture is extracted from the air during its through-passage.

Heating the items to be washed in the partial programme step preceding the "Dry" partial programme step is no longer normally necessary due to the use of reversibly dehydratable material with a hydroscopic property, e.g. zeolith. This allows a substantial saving in energy.

EP 0 358 279 B1 discloses a dishwasher with a closed drying system in which the air from the washing container circulates through a drying device that can be regenerated by heating and from this device back into the washing container. The drying device is assigned to the heater arranged outside the washing container for the rinsing liquor, this heater preferably being a geyser. The outlet of the washing container is located in the ceiling of the washing container, whilst the inlet is integrated in the rinsing tank of the washing container. The outlet of the washing container is connected to the sorption drying device by means of an air duct. Since the sorption drying device is assigned to the heater for the rinsing liquor it is arranged in a region underneath the rinsing tank.

A common feature of all the arrangements described above is that the integration of the sorption drying device in a dishwasher is only conceptually described. The object of this invention is therefore to provide a dishwasher in which a sorption drying device can be integrated easily and at low cost.

BRIEF SUMMARY OF THE INVENTION

This object is achieved with a dishwasher having the features according to claim 1. Advantageous further developments of this invention are indicated in the dependent claims.

A dishwasher according to the invention, particularly a domestic dishwasher, has a washing container and devices for washing dishes by means of a rinsing liquor, as well as a sorption drying device which is connected in an air-conducting manner to the washing container via an outlet of the washing container and an inlet of the washing container, and which is provided with a sorption column encompassing reversibly dehydratable material. Here the sorption drying device is arranged between a washing container wall and an outer housing wall of the dishwasher.

According to one design the sorption column is used for drying the dishes on the one hand and the thermal energy utilised for desorption of the sorption column is used for heating the rinsing liquor in the washing container and/or the items to be washed on the other. The dishwasher can be designed, in terms of its operating principle, as described in DE 103 53 774.0 and/or DE 103 53 775.0 of the applicant, the contents of which are incorporated in this application where appropriate. The machine described here differs in terms of a preferred arrangement of the sorption drying device.

According to a preferred feature, air is conducted from the washing container and/or from the ambient air during a partial programme step with rinsing liquor to be heated, preferably during the "Clean" and/or "Pre-wash" and/or the "Clear wash" partial programme step through the sorption column and back into the washing container An electric heating element is suitably arranged for desorption of the reversibly dehydratable material and for heating the rinsing liquor and/or the items to be washed.

In a suitable design the sorption column, and optionally the electrical heating element, are arranged concentrically around the outlet and/or the inlet. Because of the concentric design a particularly low overall height and hence a particularly space-effective design of the sorption drying device are achieved. Moreover, the arrangement of the functional elements arranged underneath the rinsing tank need not be modified relative to conventional dishwashers. The outlet is located in a lateral wall. The inlet, or even a plurality of inlets, may be arranged in the same washing container wall, in the rinsing tank or in the washing container ceiling. The first-mentioned variant here offers the advantage of an extremely simple structural design, sine the installation of air ducts may be largely dispensed with. On the other hand the provision of air ducts offers the advantage, already mentioned, that the condensation area is designed so that the sorption column of the sorption drying device can be generally constructed much smaller.

The electrical heating element is preferably arranged in the reversibly dehydratable material or in a pipe to the sorption column.

According to a further suitable design the outlet and/or inlet is/are provided with a passive means for sealing against penetrating water. in the simplest case this may be cover over the outlet and/or inlet which is preferably designed so that at the same time the direction of the air flow is established to achieve the best possible turbulence of the air in the washing container for effective moisture absorption.

In an alternative design the outlet and/or the inlet may be provided with active sealing means. The sealing means may be designed, for example, so that it can be actuated by applying a voltage. The sealing means may therefore be designed so that it is motor or hydraulically driven. It is particularly advantageous here if voltage is also applied to the sealing means when voltage is applied to the fan, enabling the sealing means to open to provide air circulation to the sorption drying device. Here the inlet and outlet need only be open during the regeneration phase of the sorption column and during the "Dry" partial programme step. During the other partial programme steps the sealing means provide such sealing to prevent spray water from penetrating the sorption drying device provided with electrical functional elements.

In a further suitable design the sealing means may also be actuated by a temperature-sensitive memory metal. Here the sealing means is not actuated electrically but on the basis of the temperatures prevailing during different partial programme steps.

BRIEF DESCRIPTION OF THE DRAWINGS

The invention is explained in further detail in the following with reference to a FIGURE in which is shown an exemplary embodiment of a dishwasher according to the invention.

DETAILED DESCRIPTION OF EXEMPLARY EMBODIMENTS OF THE PRESENT INVENTION

The FIGURE shows, in a diagrammatic representation, a dishwasher 1 of the invention with a washing container 2, in which are arranged crockery baskets, not shown, for the storing of items to be washed, not shown either. Dishwasher 1 is provided with a sorption column 10 which is connected in an air-conducting manner to washing container 2 and encompasses reversibly dehydratable material 11, sorption column 10 being used on the one hand for drying and on the other hand for heating air passed through. Washing container 2 has an outlet 5 which is arranged in the exemplary embodiment described in a central region and an inlet 8 arranged in the exemplary embodiment described close to a rinsing tank 6, which inlet is connected by a pipe designed as an air duct 17 to sorption column 10. In addition to sorption column 10, a sorption drying device 21 has a fan (not shown) and a heating element 12. The passage of air through sorption drying device 21 is denoted by arrows A, B and C.

Sorption drying device 21 is arranged between a washing container wall 22 and an outer housing wall 23, electric heating element 12 and sorption column 10 being arranged concentrically around outlet 5. This provides a particularly space-saving arrangement since no additional space, in which all the functional components of a dishwasher are normally arranged, is taken up underneath the rinsing tank. Outlet 5 is located in this exemplary embodiment in the centre of washing container wall 22. Merely by way of example a single inlet 8 is shown which is located underneath sorption drying device 21 in the lower region of washing container wall 22 and is connected to it by means of an air duct 17.

According to another design a multiplicity of inlets 8 could be provided, which are arranged, for example, concentrically around outlet 5.

In a further variant inlet 8 could also be arranged in the rinsing tank or in the washing container ceiling.

Contrary to the previous description, the outlet identified in the FIGURE by reference number 5 could also represent an inlet of sorption drying device 21, in which case the inlet identified in the FIGURE by reference number 8 would then represent the outlet of sorption drying device 212. AS a result the outlet of washing container 2 would be connected by air duct 17 to sorption column 10. Here air duct 17 could be designed as a condensation area, thereby reducing the amount of moisture contained in the moist air and enabling sorption column 10 to be dimensioned smaller.

The fan not shown in the FIGURE could be designed as an axial fan in the region of outlet 5, but in this variant adequate protection against penetrating spray water would have to be considered. Here an active sealing means could be provided, in particular, as described above. However, arranging the fan as a radial fan in air duct 17 would also be conceivable.

To prevent penetration of spray water into outlet 5, inlet 8 and hence the electrical functional parts (fan, heating element 12) of sorption drying device 21 during a partial programme step to which items to be washed are subjected, outlet 5 has a sealing means which may be designed as a passive sealing means in the form of a cover, e.g. with a flow function (not shown). Correspondingly inlet 8 has a sealing means 15 which may be designed, for example, as a cover with a flow function.

Both outlet 5 and inlet 8 could be provided with an actively actuated sealing means according to another variant, not shown either. which sealing means would be opened during the operation of sorption drying device 21 and closed in the remaining partial programme steps. Particularly advantageous here is a direct coupling to the operation of the fan and/or electric heating element 12. Thus the active sealing means could be actuated by means of a motor and/or hydraulically, the actuation being dependent on the operation of the sorption drying device. Alternatively the use of a memory metal would also be conceivable, which metal cold be brought into an opening or closing position according to the varying temperatures during different partial programme steps.

With this invention a dishwasher is provided which can be produced economically and with which the items to be washed in the washing container can be cleaned and dried efficiently, with the possibility of minimising the associated energy expenditure.

What is claimed is:

1. A dishwasher, comprising:
a housing having an outer housing wall;
a washing container having an inlet, an outlet, and a washing container wall;
a device to wash crockery in the washing container with a washing solution; and
a sorption drying device connected to the washing container via the inlet and the outlet of the washing container in an air-conducting manner, the sorption drying device arranged between the outer housing wall and the washing container wall and having a sorption column that includes reversibly dehydratable material to dry the crockery, wherein the sorption column is concentrically arranged around at least one of the inlet and the outlet of the washing container;
wherein thermal energy for desorption of the sorption column is utilized to heat up at least one of the washing solution and the crockery in the washing container.

2. The dishwasher of claim 1, wherein at least one of air from the washing container and ambient air is directed through the sorption column and into the washing container during a partial program step of the dishwasher that heats up the washing solution.

3. The dishwasher of claim 2, wherein the partial program step of the dishwasher is at least one of a partial program step "clean", a partial program step "pre-wash", and a partial program step "clear wash".

4. The dishwasher of claim 1, further comprising a heating element to desorb the reversibly dehydratable material and to heat up at least one of the washing solution and the crockery.

5. The dishwasher of claim 4, wherein the heating element is concentrically arranged around at least one of the inlet and the outlet of the washing container.

6. The dishwasher of claim 4, further comprising a pipe connecting the washing container to the sorption column, and wherein the heating element is arranged in one of the reversibly dehydratable material and the pipe.

7. The dishwasher of claim 1, wherein at least one of the inlet and the outlet of the washing container has passive sealing means to prevent water intrusion through the at least one of the inlet and the outlet.

8. The dishwasher of claim 1, wherein at least one of the inlet and the outlet of the washing container has active sealing means.

9. The dishwasher of claim 8, wherein the active sealing means is structured to be actuated by an active sealing means voltage applied to the active sealing means.

10. The dishwasher of claim 9, wherein the sorption drying device comprises a fan, and wherein, when a fan voltage is applied to the fan, the active sealing means voltage is applied to the active sealing means.

11. The dishwasher of claim 10, further comprising a temperature-sensitive memory metal to actuate the active sealing means.

12. A dishwasher, comprising:
a washing container having an inlet and an outlet;
a device to distribute a washing solution in the washing container so as to wash crockery in the washing container;
a sorption drying device connected to the washing container via the inlet and the outlet of the washing container in an air conducting manner and having a sorption column that includes reversibly dehydratable material to dry the crockery in the washing container, wherein the sorption column is concentrically arranged around at least one of the inlet and the outlet of the washing container.

* * * * *